United States Patent [19]

Isawa et al.

[11] Patent Number: 5,500,655

[45] Date of Patent: Mar. 19, 1996

[54] TERMINAL KEY LOCKING SYSTEM

[75] Inventors: Minae Isawa; Yumiko Nakamura, both of Kawasaki, Japan

[73] Assignee: Fujitsu Limited, Kawasaki, Japan

[21] Appl. No.: 296,971

[22] Filed: Aug. 26, 1994

Related U.S. Application Data

[63] Continuation of Ser. No. 956,179, Oct. 5, 1992, abandoned.

[30] Foreign Application Priority Data

Oct. 3, 1991 [JP] Japan ..................... 3-256079

[51] Int. Cl.[6] ...................................... G09G 3/02
[52] U.S. Cl. ........................... 345/168; 345/169
[58] Field of Search ................... 345/160, 169, 345/173, 146, 156, 168; 348/838

[56] References Cited

U.S. PATENT DOCUMENTS

| | | | |
|---|---|---|---|
| 4,458,238 | 7/1984 | Learn | 345/169 |
| 4,639,225 | 1/1987 | Washizuka | 348/838 |
| 4,992,779 | 2/1991 | Sugino et al. | 345/173 |
| 5,165,012 | 11/1992 | Crandall et al. | 345/146 |

FOREIGN PATENT DOCUMENTS

| | | |
|---|---|---|
| 52-149917 | 12/1977 | Japan . |
| 59-106027 | 6/1984 | Japan . |
| 59-114626 | 7/1984 | Japan . |
| 1-253020 | 10/1989 | Japan . |

*Primary Examiner*—Curtis Kuntz
*Assistant Examiner*—Vivian W. Chang
*Attorney, Agent, or Firm*—Armstrong, Westerman, Hattori, McLeland & Naughton

[57] ABSTRACT

An information processor equipment in use for a terminal key locking system includes: an input key device for inputting data; a terminal key locking unit for locking the input key and generating a plurality of mode signals concurrently with the locking; a plurality of gates corresponding to the modes and connected to a plurality of controllers the output of which is connected to a display control unit; a display unit connected to the display controller, for displaying picture signals; a first memory device connected to the display control unit for saving operating display information; and a second memory device connected to the display control unit for storing in advance picture signals representing each discriminated mode signal; wherein the previously stored picture signals are displayed in correspondence to one of the modes and when the lock is released, an original operative picture signal is returned to the display unit, and wherein the gates are respectively operated according to incoming mode signals.

14 Claims, 7 Drawing Sheets

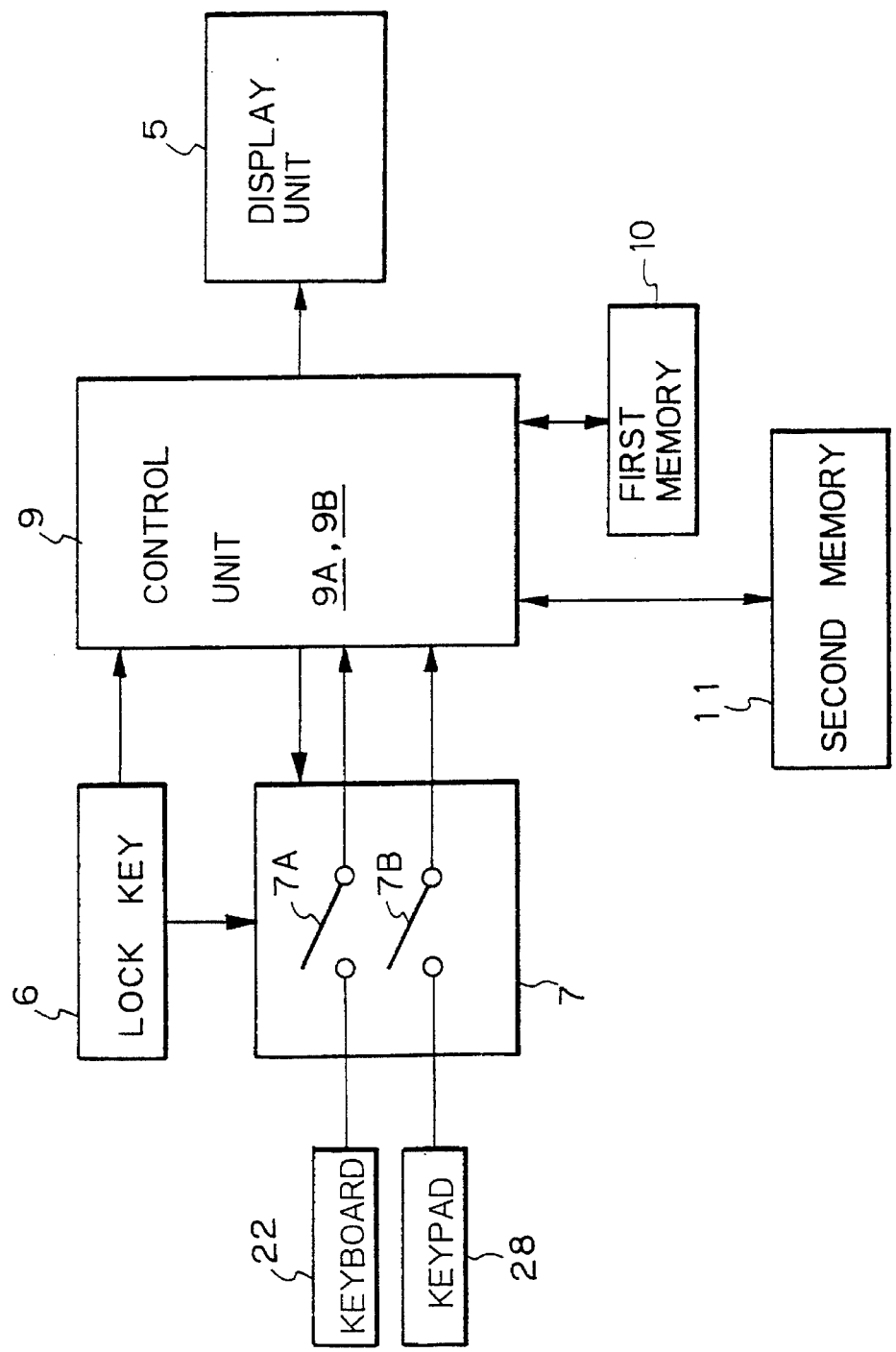

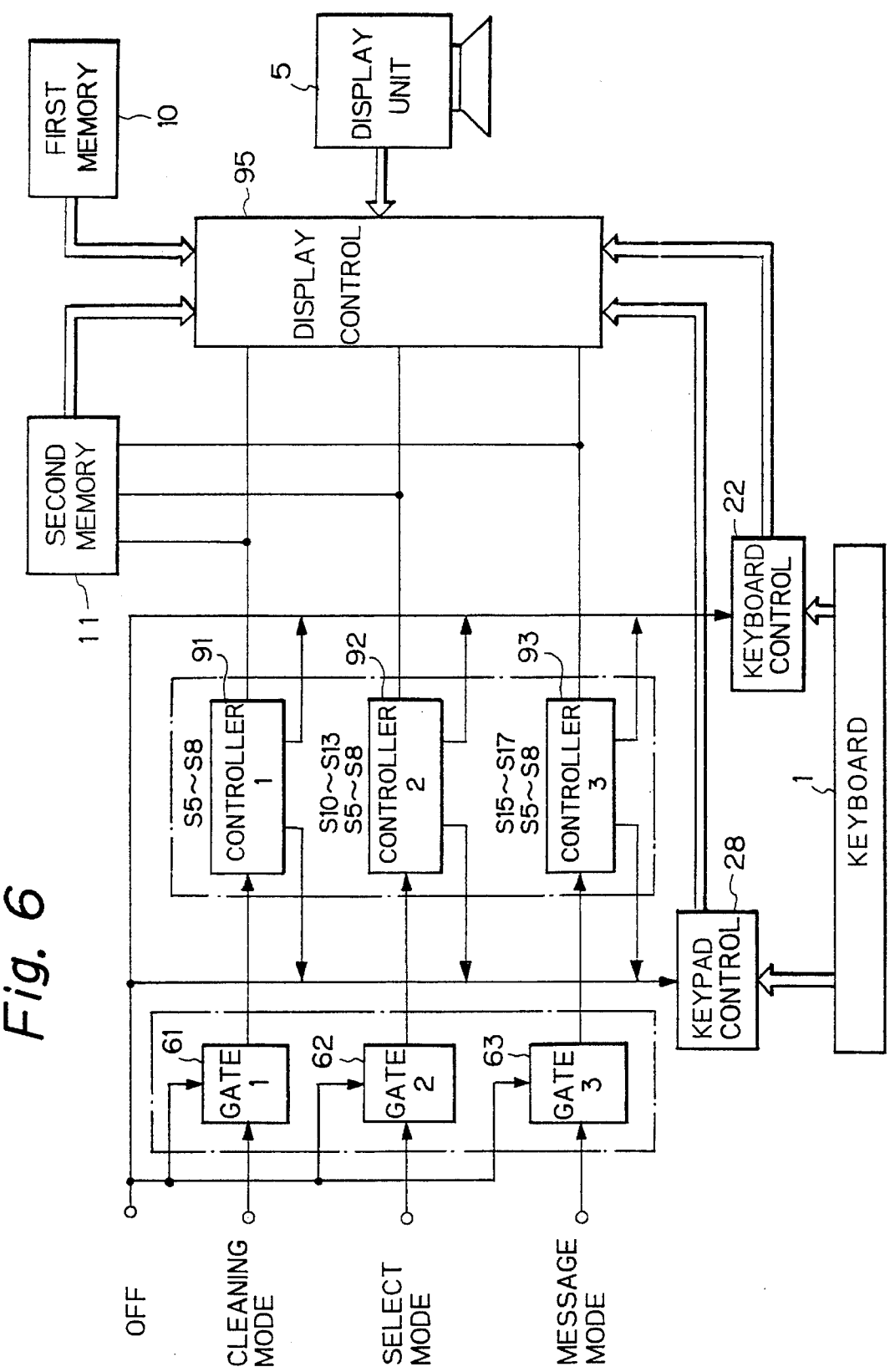

TERMINAL KEY LOCKING SYSTEM

This application is a continuation of application Ser. No. 07/956,179 filed Oct. 5, 1992, now abandoned.

BACKGROUND OF THE INVENTION

1. Field of the Invention

The present invention relates to a terminal key locking system, and more particularly to a system that enables locking a keyboard while cleaning.

2. Description of the Related Arts

In general, input keys on a personal computer or office automation equipment are configured so that wiping the keys is difficult even when they need to be cleaned.

Since accidentally touching the input keys may introduce errors, even if ash is dropped from an operator's cigarette, coffee or some other liquid is spilled on the keys, or a staple is dropped between the keys, in the course of operating a computer, the operator cannot freely wipe the input keys.

When an operator must move away from the keyboard for some reason, there is a danger that other people might accidentally touch the input keys, so the operator's work must be terminated before leaving the keyboard.

Therefore, in such case, it is desirable that the input keys be lockable in such a manner that when the lock is released, the previous working state is returned to.

In a prior art information processor, for example, the processor is connected to a keyboard equipped with input keys and a display unit. While depressing the input keys, an operator inputs and manipulates data while looking at the display unit.

In such prior art information processor equipment, for example, even if the operator drops the ash from a cigarette or spills coffee or other liquid on the keyboard in the course of operating, since he cannot touch the input keys at random, it is not possible to immediately wipe off the keyboard.

Further, if the operator must move away from the input keys for some reason, there would be a danger of data being lost or damaged by someone accidentally touching the keyboard.

Moreover, when a printed text is being referred to while operating the equipment, the text is sometimes rested on the input keys and the weight of the text can inadvertently depress the keys.

Also, when a staple is dropped between the keys, the operator cannot freely remove the staple.

In light of these problems in the prior art system, the present invention has been made.

It is an object of the present invention to provide a locking system for input keys on, for example, an information processor such as a personal computer, which enables immediate wiping of the keys when they need to be cleaned, which enables an operator to move away from the keys without fear of their being accidentally depressed, and which enables an operator to review a text placed on the input keys when working space is limited.

SUMMARY OF THE INVENTION

In accordance with a feature of the present invention, there is provided an information processor equipment in use for a terminal key locking system, including: an input key device for inputting data, consisting of switches with marked keytops that, when pressed manually, generate a code representing individual characters; a terminal key locking unit for locking the input keys and generating a plurality of mode signals concurrently with the locking; a plurality of gates corresponding to the modes and connected to a plurality of controllers the output of which is connected to a display control unit; a display unit connected to the display controller, for displaying picture signals; a first memory device connected to the display control unit for saving operating display information; and a second memory device connected to the display control unit for storing in advance picture signals representing each discriminated mode signal; wherein the previously stored picture signals are displayed in correspondence to one of the modes and when the lock is released, an original operating display information is returned to the display unit, and wherein the gates are respectively operated according to incoming mode signals.

Further, in accordance with another feature of the present invention, there is provided a terminal key locking system of, for example, an information processor equipment having input keys for inputting data and a display unit for displaying images, the system including the steps of: depressing a lock key; locking input keys; saving operating display information selecting either of specified use-mode signals; and effecting the specified use-mode.

BRIEF DESCRIPTION OF THE DRAWINGS

FIG. 4 is a connection diagram showing an internal connection of a key locking system of the present invention;

FIG. 6 is a mode select circuit showing the operation of FIGS. 3 and 4.

PREFERRED EMBODIMENTS OF THE INVENTION

With reference to the drawings, an embodiment of the present invention will be described in detail.

Figure 1:
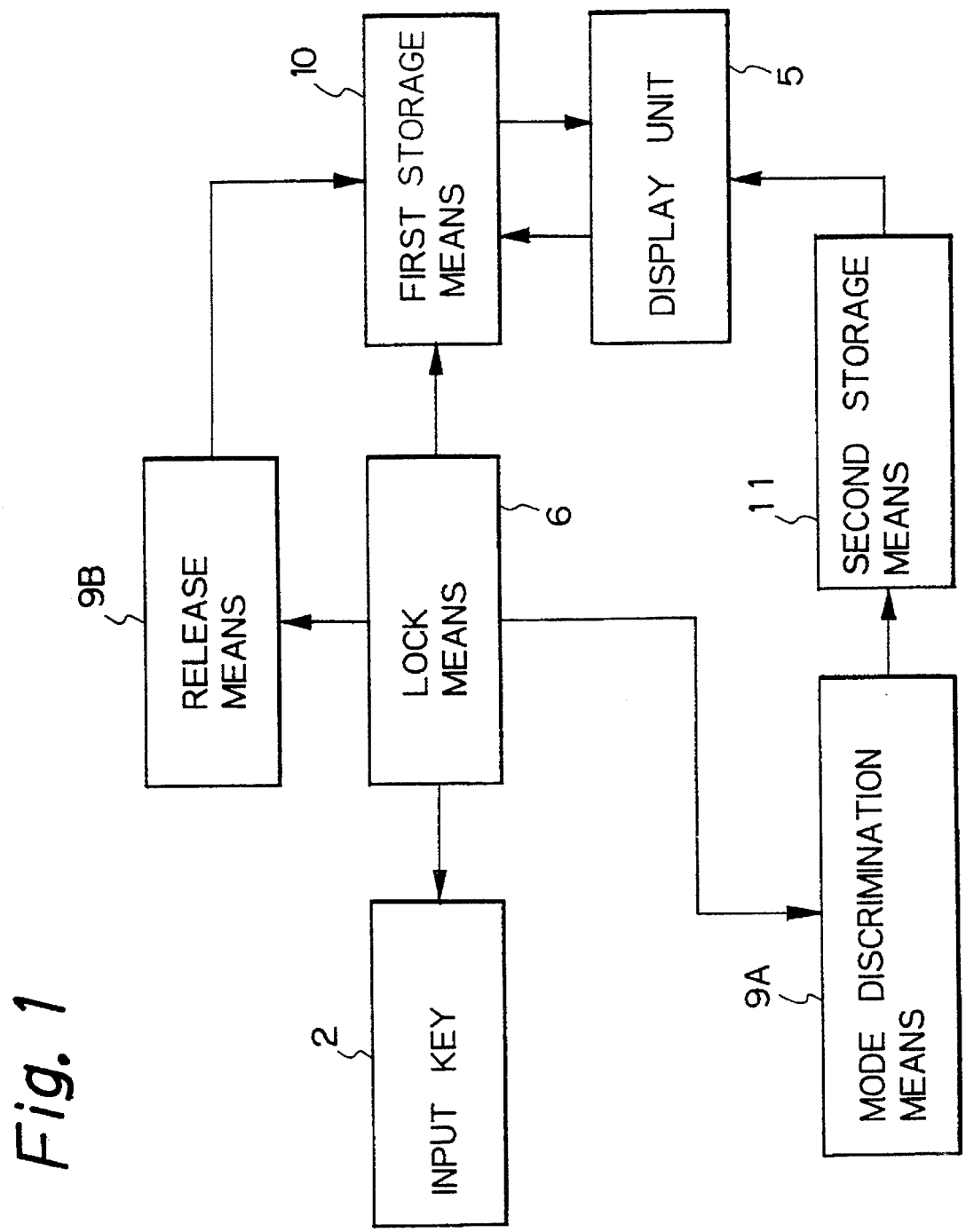
FIG. 1 is a block diagram showing the arrangement of an embodiment in accordance with the present invention.

FIG. 1 is a block diagram showing the arrangement of an embodiment in accordance with the present invention. In FIG. 1, reference numeral 2 denotes input keys for inputting data, 5 a display unit for displaying data, 6 a lock means for locking the input keys 2 and simultaneously generating a plurality of modes, 10 a first storage means for storing the display information while in a locked state, 9A a mode discrimination means for discriminating the plurality of modes, 11 a second storage means for previously storing a picture showing each mode which is discriminated, and 9B a release discrimination means for discriminating a release of the lock means 6.

In FIG. 1, when input keys 2 are locked by the lock means 6, picture information on the display unit 5 is stored in the first storage means 10.

If the lock means 6 is set to any mode, the mode is discriminated by a mode discrimination means 9A and a picture denoting the mode that is stored in a second storage means 11 in advance is displayed on a display unit 5.

Then, when release of the lock means 6 is discriminated by the release discrimination means 9B, original picture information stored in the first storage means 10 is returned to the display unit 5.

Therefore, suppose that the above-described mode be, for example, "a wiping mode", when an operator wishes to wipe a processor equipment showing that the wiping of keys in the target equipment is feasible, he can immediately wipe it. Meanwhile, a picture of "a wiping mode" is displayed on the display unit 5 and when a "select mode" is selected, a picture of his whereabouts or the like is selected to display it on the display unit 5 and he can leave his seat immediately in the course of an operation.

Further, it is advantageous that an operator can review a printed text even in a narrow working space by resting it on the equipment.

FIGS. 2 to 6 are drawings showing an embodiment of the present invention.

Figure 2:
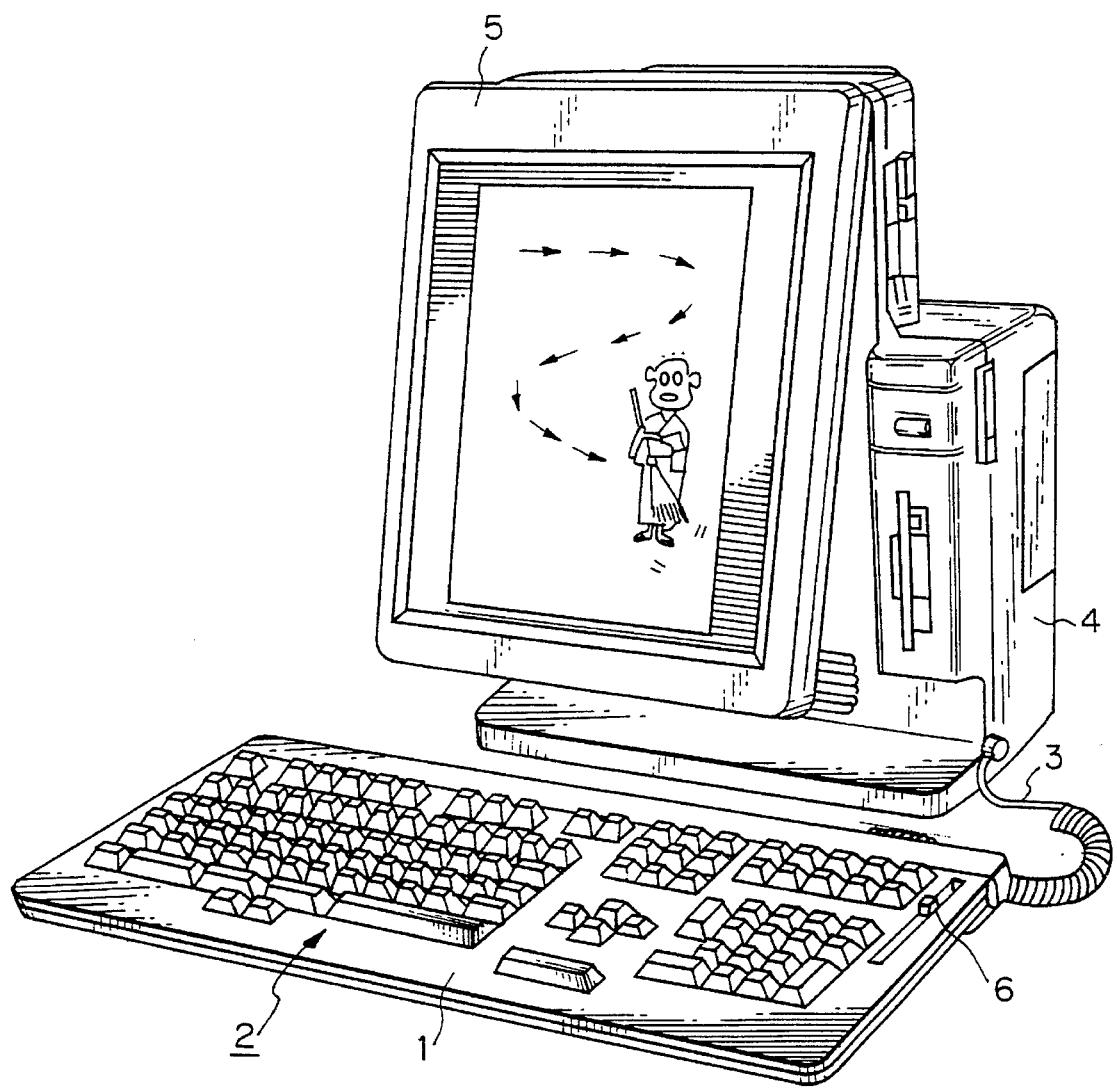
FIG. 2 is a perspective view showing a personal computer embodying a locking key according to the present invention.

FIG. 2 is a perspective view showing a personal computer employing the present invention. Reference numeral 1 denotes a keyboard which is provided with input keys 2 for inputting letters, digits and Japanese characters, and including a ten-key keypad. The keyboard 1 is connected to a computer 4 via a signal line 3 and the computer 4 is provided with a display unit 5.

Reference numeral 6 is a lock key arranged on the keyboard 1 for locking the input keys.

Figure 3:
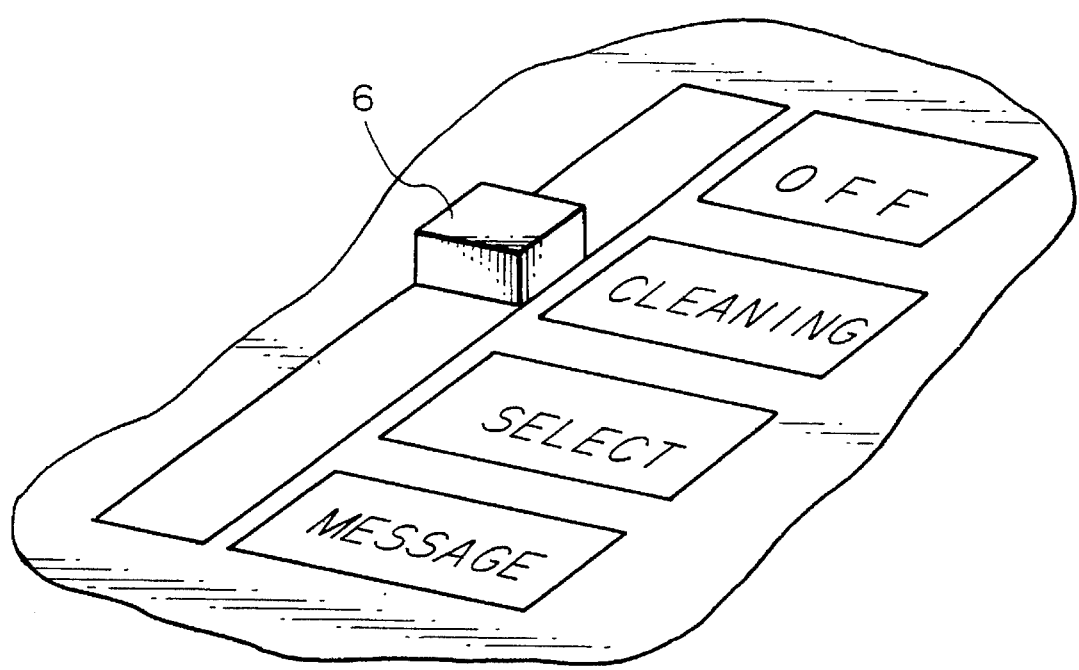
FIG. 3 is a perspective view showing an embodiment of the terminal locking key in FIG. 2 in accordance with the present invention.

FIG. 3 is a perspective view showing an embodiment of the lock key in FIG. 2 in accordance with the present invention.

The lock key 6 is normally in the OFF position shown in FIG. 3, and when it is turned ON, a mode such as a "cleaning mode", "select mode" or "message mode" can be selected.

FIG. 4 is a connection diagram showing an internal connection of a key locking system of the present invention.

As shown in FIG. 4, when the lock key 6 is in an OFF state, a switch 7 is closed and each input is applied to the switch 7 from a keyboard 22 and a keypad 28.

If the lock key 6 is in an ON state, the switch 7 is open and no input is applied to the switch 7 from the keyboard 22 and the keypad 28. That is, the keyboard 22 and the keypad 28 enter a locked state.

Depending on the position of the lock key 6 a mode signal is input to a control unit 9 and, for example, in the case of "select mode" being selected, the switch 7B is closed by the control unit 9 to receive input from the keypad 28. When a predetermined input from the keypad 28 is applied to the switch 7B, the switch 7B is opened placing the keypad 28 in a locked state.

In the case of "message mode" being selected, the switch 7A is closed by the control unit 9 and an input from the keyboard 22 is received. When a message is input from the keyboard 22, the switch 7A is opened placing the keyboard 22 in a locked state.

If "cleaning mode" is selected, the switch 7 is open so that signals from both the keyboard 22 and the keypad 28 are not input thereto.

Reference numeral 10 is a first memory as a first storage means, and in a locked state where the lock key 6 is turned ON, the operating information displayed on the display unit 5 is moved to the first memory 10.

Reference numeral 11 is a second memory as a second storage means which stores an image related to the cleaning mode as shown on the display 5 in FIG. 2, an image related to select mode, for example, a picture showing a case of ringing and the like.

The control unit 9 is divided into a mode discrimination means 9A that discriminates between a plurality of modes based on mode signals from the lock key 6, and a release discrimination means 9B that discriminates a release of the keyboard 22 or the keypad 28 from a locked state.

FIG. 5 is a flow chart explaining the operation of an embodiment in accordance with the present invention.

In FIG. 5, in a step S1, when the lock key 6 is depressed, in a step S2, input keys 2 are locked and signals from both the keyboard 22 and keypad 28 are not input.

In a step S3, operating display information is stored. That is, when an ON signal from the lock key 6 is delivered to the control unit 9, the control unit 9 moves the operating display information from the display unit 5 to the first memory 10.

Then, in a step S4, when the mode discrimination means 9A discriminates that the operator has selected cleaning mode, in a step S5, an image, for example, a character sweeping with a broom to indicate cleaning mode, is fetched from the second memory 11 and displayed.

Meanwhile, if the keyboard 22 or the keypad 28 is depressed inadvertently while cleaning the keyboard 1, since the operating display information is stored in the first memory 10, and no signal input is accepted from the input keys, there is no negative effect on the display information and no loss or damage of data.

Meanwhile, in a step S6, the lock key 6 is monitored and in a step S7, it is discriminated whether the lock key 6 has been released. If NO, then the operation returns to the step S6, and if YES, then operation proceeds to a step S8, where operating display information is returned to the display unit 5 from the first memory 10.

In a step S4, if the cleaning mode is not selected, operation proceeds to a step S9, where selection of the select mode is discriminated. For example, if an operator receives a telephone call in the course of operating a computer or a word processor, if the lock key 6 is switched over to the select mode, the mode discrimination means 9A discriminates that select mode is active, and in a step S10, the switch 7B connected to the keypad 28 is turned ON by the control unit 9 to release the keypad 28 from the locked state.

Next, in a step S11, an image can be selected to display on the display unit 5 to, for example, show the whereabouts of an operator. In a step S12, when a picture of a select mode is displayed, for example, a mode of "on the phone" is selected by the keypad 28. In a step S13, the keypad 28 is locked again and then, in a step S5, an image of a character talking on the phone, for example, appears on the display unit 5. Thereafter, in the same way as described above, in a step S6, the lock key 6 is monitored and in a step S7, if the lock key 6 is released, in a step S8, the original operating display information is returned to the display unit 5.

Further, when it is determined that the select mode is not selected in the step S9, and a message mode is discriminated in a step S14, the keyboard 22 is released in a step S15, and a message an operator needs to input is input from the keyboard 22 in a step S16. When the keyboard 22 is locked again in a step S17, a message that an operator has input in the step S16 is displayed on the display unit 5 in the step S5. Thereafter, the operation is the same as described above, i.e., the lock key 6 is monitored in a step 6, the lock key 6 is released in a step S7 and the original operating display information is returned to the display unit 5 in the step S8.

The above makes it advantageous for an operator to clean the keyboard of a computer immediately. In this case, an image representing the cleaning mode is displayed on the display unit 5.

It is also advantageous in that the operator can move away from the keyboard at any time, even while performing some operation on the display, and in this case, an image representing the "select mode" and showing the whereabouts of the operator is displayed on the display unit 5. Or, in the "message mode", the operator himself can input a message to be displayed.

Further, it is advantageous in that an operator can review a painted text by resting it on the computer keyboard when working in a narrow space.

FIG. 6 is a mode select circuit showing the operation of FIGS. 3 and 4. The terminal locking key 6 includes the settings OFF, CLEANING MODE, SELECT MODE and MESSAGE MODE. The switch includes gate circuits 61 to 63. The control unit 9 includes controllers 91 to 93. The display unit 5 is controlled by a display control unit 95 to which a first memory 10 and a second memory 11 are connected and to which a keyboard control unit 22 and a keypad control unit 28 are connected. And a keyboard 1 is controlled by the keyboard control unit 22 and the keypad control unit 28.

The controller 1 (91) serves as a control unit which controls the cleaning mode, viz., Step 4 and Step 5 to Step 8. The controller 2 (92) serves as a control unit which controls the select mode, viz., Step 9 and Step 10 to Step 13 and Step 5 to Step 8. The controller 3 (93) serves as a control unit which controls the message mode, viz., Step 14, Step 15 to Step 17 and Step 5 to Step 8.

Figure 5A:
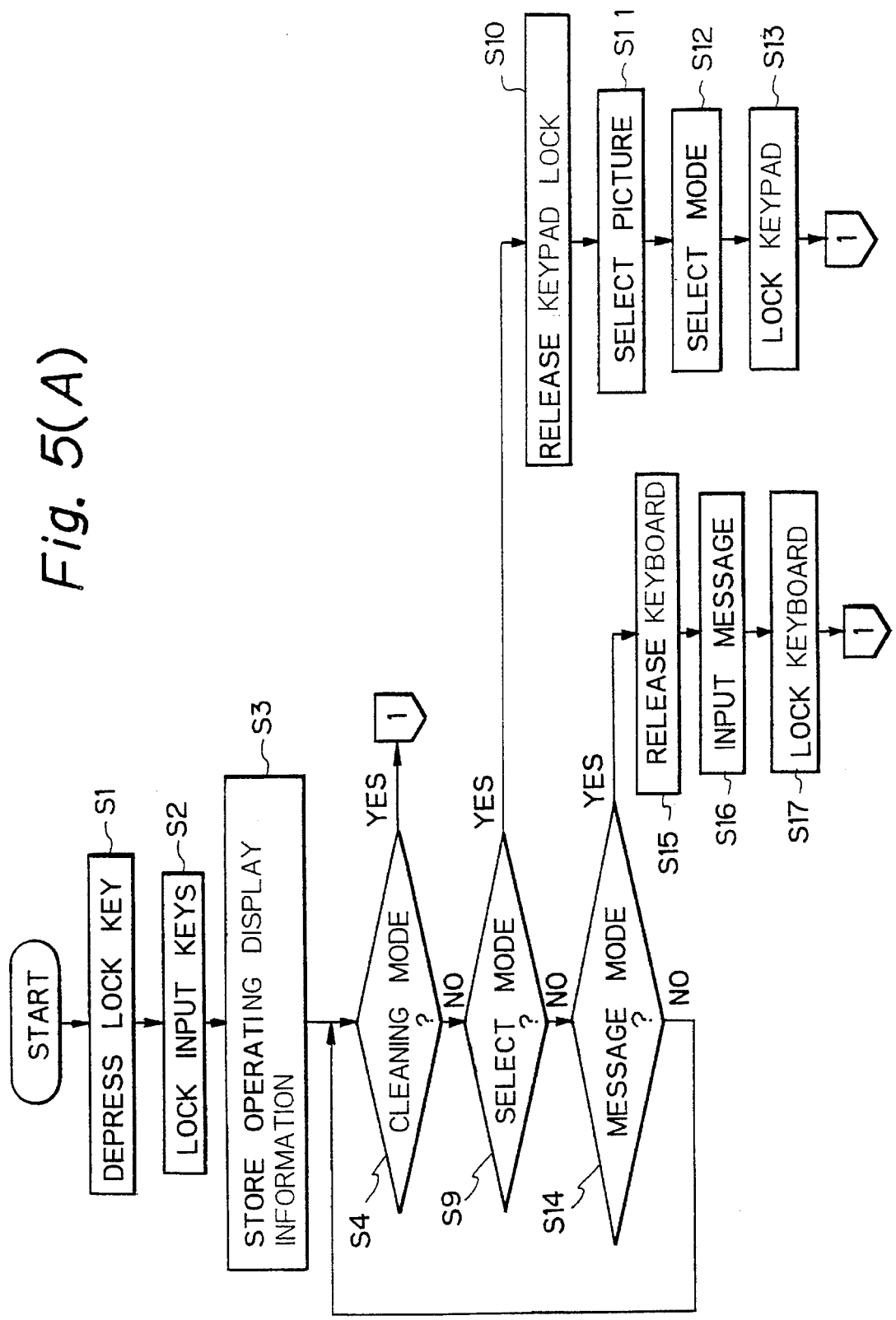
FIG. 5A and FIG. 5B are flow charts explaining the operation of an embodiment in accordance with the present invention.
Figure 5B:
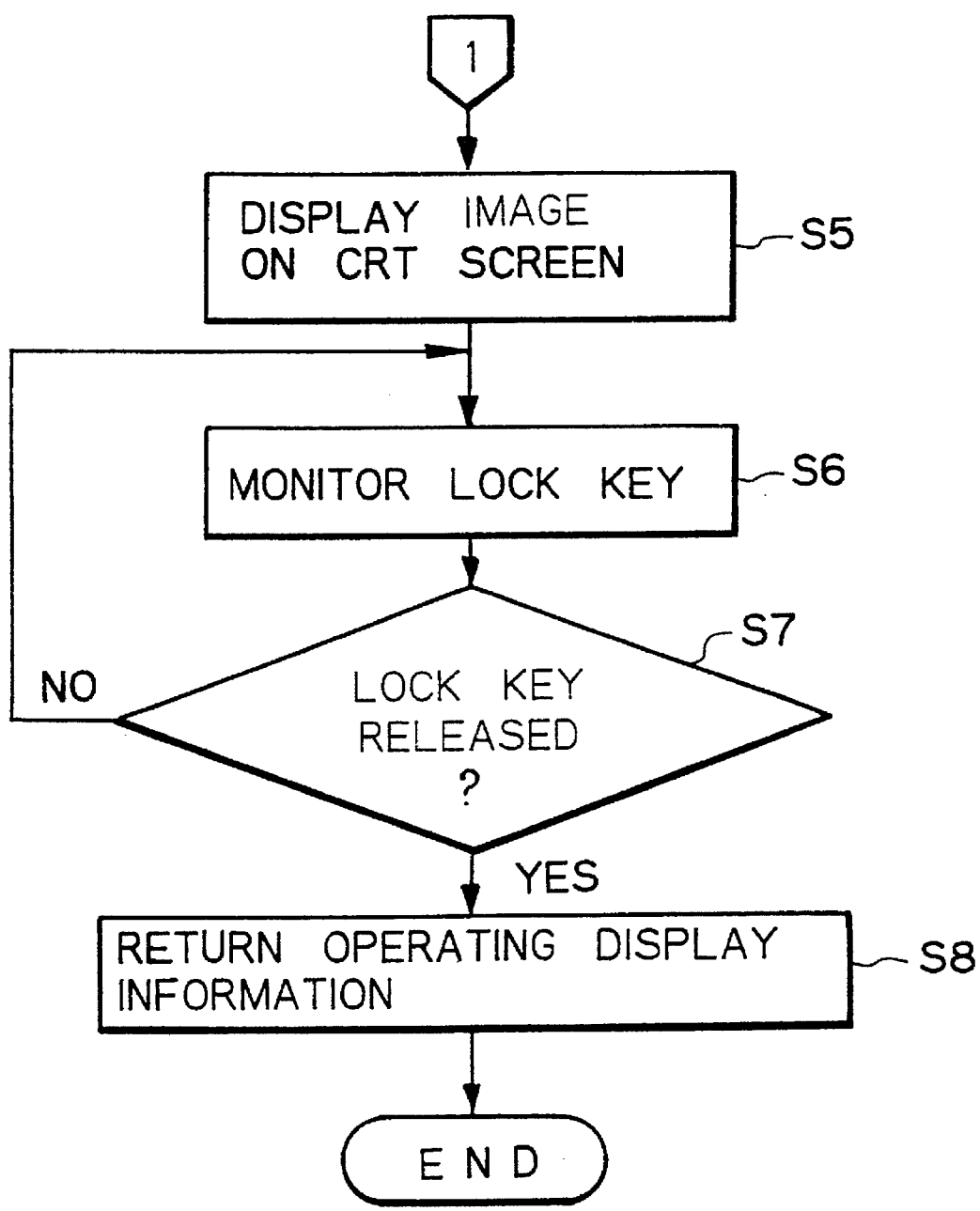

The operation of each step is the same as described in FIGS. 5(A) and 5(B).

The display unit includes an image buffer and a save memory 10 (first memory) and a main memory 11 (second memory). The image buffer is connected to the display unit 5 by a hardware circuit and the main memory is connected to the display unit 5 which serves to transfer data by software.

What is claimed is:

1. An information processor equipment in use for a terminal key locking system, comprising:

an input key device for inputting data, including switches with marked keytops that, when pressed manually, generate a code representing individual characters;

a terminal key locking unit, operably connected to said input key device, for locking said input keys and for generating a plurality of mode signals concurrently with said locking of said input keys;

a plurality of gates, operably connected to said input key device, for receiving said mode signals corresponding to said gates, said gates being connected to a plurality of controllers the output of which is connected to a display control unit;

a display unit, operably connected to said display controller, for displaying picture signals;

a first memory device, operably connected to said display control unit, for saving current display information when said terminal key locking unit locks said input keys, placing said equipment in a mode based on one of said plurality of mode signals concurrently generated with said locking of said input keys; and a second memory device, operably connected to said display control unit, for storing in advance picture signals representing each discriminated mode signal, wherein said previously stored picture signals are displayed in correspondence to one of said modes and when the lock is released, said current display information stored in the first memory device is returned to the display unit, and wherein said gates are respectively operated according to incoming mode signals.

2. An information processor equipment according to claim 1, wherein said equipment comprises a keypad control unit connected to a keyboard which controls said display control unit.

3. An information processor equipment according to claim 1, wherein said equipment comprises a keyboard control unit which controls said display control unit.

4. An information processor equipment according to claim 1, wherein a first gate is a normally OFF switch, receives a cleaning mode signal and delivers an output to a first controller to control, based on said cleaning mode signal, a display of image, a monitor and release of said lock key and a return of an original operating display information.

5. An information processor equipment according to claim 1, wherein a second gate is a normally OFF switch, receives a select mode signal, and delivers an output to a second controller to control, based on said select mode signal, a keypad lock and unlock, a select of picture and mode and then to control a display, monitor and release and return as set forth in claim 4.

6. An information processor equipment according to claim 1, wherein a third gate is a normally OFF switch, receives a message mode signal, and delivers an output to a third controller to control, based on said message mode signal, a release and lock of said keyboard and an input of message signal, and then to control a display, monitor, release and return as set forth in claim 4.

7. An information processor equipment according to claim 1, wherein said display control unit controls said display unit and further controls the image information through a first and second memory.

8. In a terminal key locking system of, for example, an information processor equipment having input keys for inputting data and a display unit for displaying images, a method for effecting a plurality of use modes comprising the steps of:

depressing a lock key;

locking input keys;

generating a plurality of use-mode signals;

saving current display information in a first storage unit when said lock key is depressed for locking said input keys, placing said equipment in a use-mode based on one of said plurality of use-mode signals concurrently generated with said locking of said input keys;

selecting one of specified use-mode signals; and effecting said specified use-mode.

9. A terminal key locking system according to claim 8, wherein after selecting a cleaning mode as one of said specified use-mode signals, said system further comprising the steps of:

displaying images on a display unit;

monitoring said lock key;

releasing said lock key; and returning operating display information.

10. A terminal key locking system according to claim 8, wherein after selecting a select mode as one of said specified use-mode signals, said system further comprising the steps of:

releasing a keypad lock;

selecting a picture on said display unit;

locking a keypad;

displaying images on said display unit;

monitoring said lock key;

releasing said lock key; and returning operating display information.

11. A terminal key locking system according to claim 8, wherein after selecting a message mode as one of said specified use-mode signals, said system further comprising the steps of:

releasing a keyboard;

inputting a message;

locking said keyboard;

displaying images on said display unit;

monitoring said lock key;

releasing said lock key; and returning operating display information.

12. A terminal key locking system according to claim 8, wherein said system further comprising the steps of:

discriminating a plurality of mode data;

storing images showing each discriminated mode data in advance;

discriminating a release of a locking;

wherein said previously stored images are displayed corresponding to any of said modes and when a lock is released, an original operating display information is returned thereto.

13. A terminal key locking system according to claim 8, wherein said system further comprising the steps of:

releasing a portion of input keys, when a specified mode is discriminated;

selecting a predetermined image from the image storing means to be displayed on the display unit; and locking a portion of the input keys again after the image is displayed.

14. A terminal key locking system according to claim 8, wherein said system comprising the steps of:

releasing all the input keys, when said mode data discrimination means discriminates the other mode data; and locking, after inputting a message, said input key again.

* * * * *